US011082246B1

(12) United States Patent
Olson et al.

(10) Patent No.: US 11,082,246 B1
(45) Date of Patent: Aug. 3, 2021

(54) SYNCHRONIZATION SOURCE (SSRC) MAPPING FOR REAL-TIME INTERACTIVE MULTIPOINT SERVER-ROUTED CONFERENCING WITH DYNAMIC RENEGOTIATION OF MULTIMEDIA-SENDING PARTICIPANTS

(71) Applicant: Infinesse Corporation, Westlake Village, CA (US)

(72) Inventors: Joseph Augustine Olson, Huntsville, AL (US); Michael Ern Kim, Los Angeles, CA (US)

(73) Assignee: Infinesse Corporation, Los Angeles, CA (US)

( * ) Notice: Subject to any disclaimer, the term of this patent is extended or adjusted under 35 U.S.C. 154(b) by 114 days.

(21) Appl. No.: 15/919,194

(22) Filed: Mar. 12, 2018

Related U.S. Application Data

(60) Provisional application No. 62/469,944, filed on Mar. 10, 2017.

(51) Int. Cl.
*H04L 12/18* (2006.01)
*H04L 29/06* (2006.01)
*H04N 7/15* (2006.01)

(52) U.S. Cl.
CPC ...... *H04L 12/1822* (2013.01); *H04L 12/1827* (2013.01); *H04L 65/608* (2013.01); *H04N 7/155* (2013.01)

(58) Field of Classification Search
CPC .......................... H04L 65/10; H04L 12/1822
See application file for complete search history.

(56) References Cited

U.S. PATENT DOCUMENTS 9,402,054 B2    7/2016  Aaron et al.
2006/0212576 A1*  9/2006  Barkley ................. H04L 29/06
                                                    709/226

(Continued)

OTHER PUBLICATIONS

"Oracle9i Application Server Best Practices," Sep. 5, 2015. (Year: 2015).*

(Continued)

*Primary Examiner* — Andrew C Georgeandellis
(74) *Attorney, Agent, or Firm* — Socal IP Law Group LLP; Michael D. Harris; Jonathan Pearce

(57) ABSTRACT

A method of real-time, dynamic allocation of multimedia streams enables large-scale, server-routed real-time conference (multipoint and interactive broadcast) sessions within advancing communication technologies such as open-standard WebRTC (Web Real-Time Communications) A Synchronization Source (SSRC) mapping concept/technique is used to efficiently manage required real-time renegotiation of media flow correlations (MFC) between session participants in a server-routed conference through the Real-time Transport Protocol (RTP) processor (Engine), collectively RTP Engine. The RTP Engine is a logic processing element that inputs RTP media packets, manipulates the information within the RTP packets, and outputs the modified RTP packets. The SSRC Mapping through the RTP Engine enables the conference server router to isolate the renegotiation to a single offer/answer exchange between a participant changing a media flow correlation and the conference server router. The result is significant real-time interactive performance, efficiency, and capability benefits to server-routed multipoint/broadcast conferences designed for global-scale applications.

19 Claims, 9 Drawing Sheets

(56) References Cited

U.S. PATENT DOCUMENTS

2013/0144984 A1* 6/2013 Zhao ................. H04L 65/608
709/219
2015/0002619 A1* 1/2015 Johnston ............ H04N 7/147
348/14.12

OTHER PUBLICATIONS

Schulzrinne, H., et al.,"RFC 3550—RTP: A Transport Protocol for Real-Time Applications," https://tools.ietf.org/html/rfc3550, Jul. 2003, The Internet Society.
Rosenberg, J., et al., "RFC 3264—An Offer/Answer Model with the Session Description Protocol (SDP)," https://tools.ietf.org/html/rfc3264, Jun. 2002, The Internet Society.
Handley, M., "RFC 4566—SDP: Session Description Protocol," https://tools.ietf.org/html/rfc4566, Jul. 2006, The Internet Society.
Roach, A.B., et al., "A Unified Plan for Using SDP with Large Numbers of Media Flows draft-roach-mmusic-unified-plan-00," https://tools.ietf.org/html/draft-roach-mmusic-unified-plan-00, Jul. 15, 2013, IETF Trust and the persons identified as the document authors.
Hickson, I., "WebRTC 1.0: Real-Time Communication Between Browsers," https://www.w3.org/TR/webrtc/m Nov. 2, 2017, W3C.

\* cited by examiner

| Server Media Flow Correlations | Sender Media Flow Correlations |
|---|---|
| Server_MFC_01 (SSRC, msid, m-line) | unassigned |
| Server_MFC_02 (SSRC, msid, m-line) | unassigned |
| Server_MFC_03 (SSRC, msid, m-line) | unassigned |
| .... | |
| Server_MFC_nn (SSRC, msid, m-line) | unassigned |

510 — 512

© 2018 Infinesse Corp.

FIG. 5

| Server Media Flow Correlations | Sender Media Flow Correlations |
|---|---|
| Server_MFC_01 (SSRC, msid, m-line) | Sender_01 (SSRC, msid, m-line) |
| Server_MFC_02 (SSRC, msid, m-line) | Sender_02 (SSRC, msid, m-line) |
| Server_MFC_03 (SSRC, msid, m-line) | unassigned |
| .... | |
| Server_MFC_nn (SSRC, msid, m-line) | unassigned |

FIG. 6

© 2018 Infinesse Corp.

| Server Media Flow Correlations | Sender Media Flow Correlations |
|---|---|
| Server_MFC_01 (SSRC, msid, m-line) | Sender_01 (SSRC, msid, m-line) |
| Server_MFC_02 (SSRC, msid, m-line) | Sender_02 (SSRC, msid, m-line) |
| Server_MFC_03 (SSRC, msid, m-line) | Sender_03 (SSRC, msid, m-line) |
| .... | |
| Server_MFC_nn (SSRC, msid, m-line) | unassigned |

FIG. 8

© 2018 Infinesse Corp.

SYNCHRONIZATION SOURCE (SSRC) MAPPING FOR REAL-TIME INTERACTIVE MULTIPOINT SERVER-ROUTED CONFERENCING WITH DYNAMIC RENEGOTIATION OF MULTIMEDIA-SENDING PARTICIPANTS

NOTICE OF COPYRIGHTS AND TRADE DRESS

A portion of the disclosure of this patent document contains material that is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights.

RELATED APPLICATION INFORMATION

This patent claims priority from U.S. provisional patent application No. 62/469,944 entitled "SYNCHRONIZATION SOURCE (SSRC) MAPPING FOR INTERACTIVE REAL-TIME MULTIPOINT SERVER-ROUTED CONFERENCING WITH DYNAMIC RENEGOTIATION OF MULTIMEDIA-SENDING PARTICIPANTS" filed on Mar. 10, 2017.

BACKGROUND

Field

This disclosure relates to a method of real-time, dynamic allocation of multimedia large-scale, server-routed real-time conference sessions within advancing communication technologies such as open-standard WebRTC (Web Real-Time Communications). The disclosure enables real-time multipoint and interactive broadcast of audio, video and data communications that are compliant with the WebRTC standard as defined by the Open WebRTC IETF/W3C standard/specifications which is incorporated herein by reference.

Description of the Related Art

Real-time communications protocol, and the related WebRTC work generally rely upon peer-to-peer connections to relay audio and video data. WebRTC can enable live streamed communications, such as audio and video chats, broadcasts, or interactive broadcasts in which viewers may actively participate through audio, video, and data. In such cases, this data may include audio and video streams associated with each participant. For this patent, the phrase "web conference" means a server-routed, audio and/or video conference involving at least two participants and conforming to the RTP or WebRTC open standard.

As used herein, "media" refers to the audio and video portion of multimedia. The WebRTC standard requires a "renegotiation" using the "offer/answer" exchange procedure between all participants involved in a web conference each time a media flow correlation is added. This offer/answer process may take place, for example, when a non-participant seeks to begin transmitting audio as a media flow during a web conference or after joining a web conference. A "media flow correlation" is an entry added to a media flow correlation ("MFC") pool that identifies the sender of a particular media flow.

As used herein, "participant" means a computing device that is able to send and receive one or more media flows during a web conference. A "listener" means a computing device that has joined a web conference, and that may or may not receive one or more media flows, but cannot send any media flows for that web conference. A "non-participant" means a computing device that has not yet joined a web conference and, therefore, currently is unable to send any media flows during a web conference. as used herein, "routing" refers to the relay or forwarding of media flows from one participant to other participants and non-participants by a server. To "participate" means to receive or send a media flow. A "media flow" as used herein means an audio, video, or data stream transmitted by a participant during a web conference. These media flows are composed of Real Time Transport Protocol, ("RTP") information packets which is defined in RFC 3550, and incorporated herein by reference. The associated data packets include the source of each stream identified by an associated Synchronization Source ("SSRC") value as defined by WebRTC1.0 which is likewise incorporated herein by reference.

Internet communication technologies, such as WebRTC commonly use "offer/answer", session description protocols ("SDP"), and media flow correlations for signaling and exchange of information required to establish a usable connection for web conferencing. These types of protocols are defined in RFC 3264, while SDP protocols are defined by RFC 4566, and media flow correlations are defined in IEFT Draft Unified Plan for Using SDP with Large Numbers of Media flows (dated Jan. 16, 2014). Each of these protocols and plans are incorporated herein by reference. The current approach, described in U.S. Pat. No. 9,402,054, for dealing with many simultaneous media flows is flawed. The web conference may be "multipoint" (typically 10-100 participants and listeners) or "interactive broadcast" (involving potentially tens/hundreds of millions of participants and listeners). This offer/answer renegotiation must occur each time an media flow correlation associated with a media flow is added, updated, or removed from a server-routed conference connection. When these media flows are added the SSRC, the WebRTC standard requires that the offer/answer renegotiation of media flow correlations between session participants and listeners in a web conference. In addition, an RTP logic processor is required that inputs RTP media packets, manipulates the information within the RTP packets, and outputs the modified RTP packets associated with SSRC handling.

Current technologically advancing real-time communication protocols such as WebRTC is based upon a basic foundation of peer-to-peer (also referred to as point-to-point) connections to exchange multimedia (audio, video and data) streams. The web conference is based on a centralized conference server or router—called a "web conference server" here—is often used to initiate a web conference and to direct traffic associated with each web conference.

Initiation of a web conference leads to extreme problems/limitations. In particular, the offer/answer negotiation with the web conference server must occur involving the web conference server and each participant or listener each time a non-participant joins a web conference, and when media streams are added to or removed from a web conference by a participant or listener. This negotiation, and in particular, the renegotiation for all conference participants and listeners becomes a significant problem. Specifically, it becomes unwieldy due to the complexity involved and causes unacceptable delays in an ongoing web conference. Both of these problems grow as the number of conference participants and listeners increases, beginning with a number of participants and listeners as low as five. In addition, video cannot be received by each participant and non-participant until the entire renegotiation process is complete for all participants and listeners. The delay tends to compound as other participants or listeners drop or otherwise cease participation.

DESCRIPTION OF THE DRAWINGS

FIG. 5 is a functional diagram of a status of media flow allocations.

FIG. 6 is a functional diagram of a status of media flow allocations after two participants have been allocated.

FIG. 8 is a functional diagram of a status of media flow allocations after three participants have been allocated.

Figure 1:
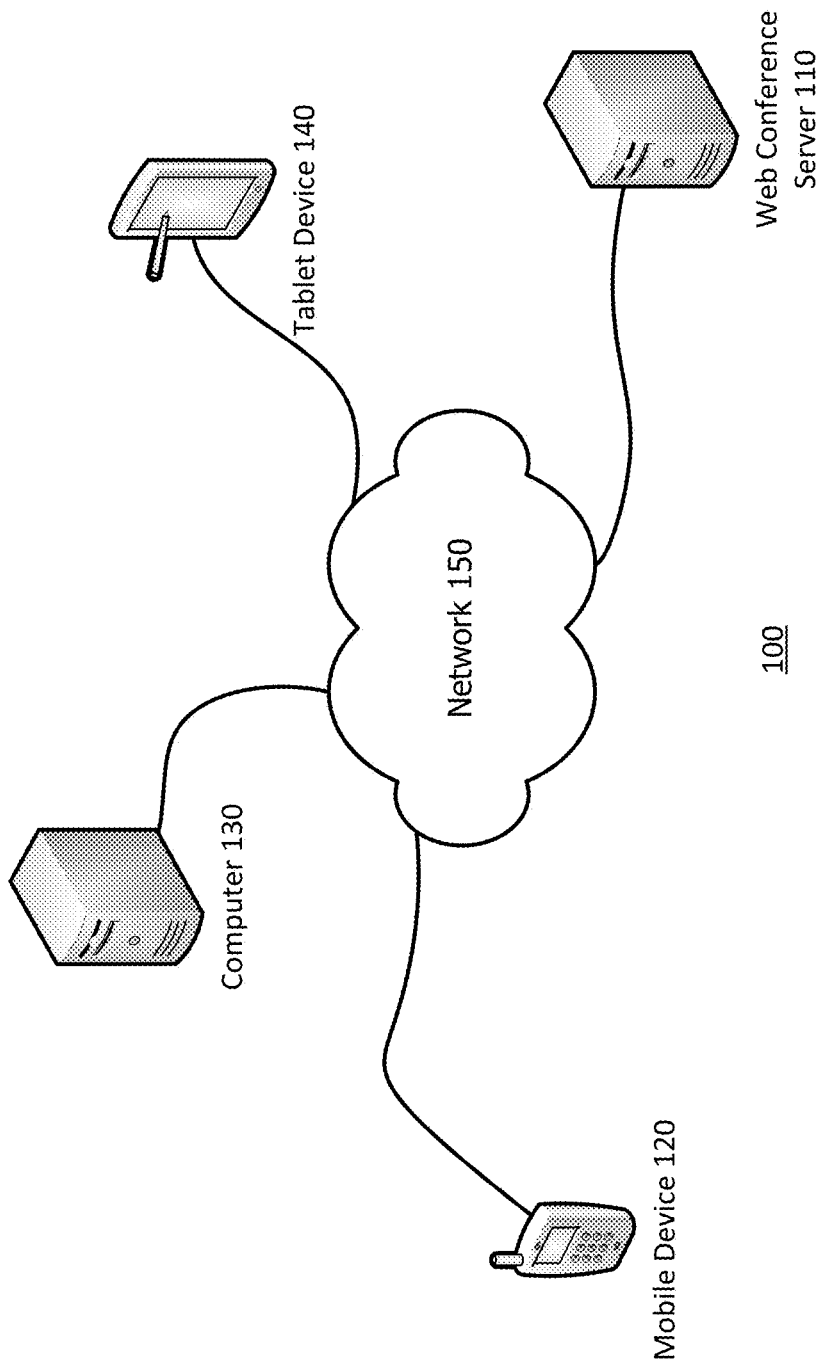
FIG. 1 is a block diagram of a system for web conferencing.

Throughout this description, elements appearing in figures are assigned three-digit reference designators, where the most significant digit is the figure number and the two least significant digits are specific to the element. An element not described with a figure may be presumed to have the same characteristics and function as a previously-described element having a reference designator with the same least significant digits.

DETAILED DESCRIPTION

Description of Apparatus

An SSRC Mapping concept/technique described here is used to efficiently manage real-time renegotiation of media flow correlations between web conference participants in a web conference. It provides a mechanism for the RTP Engine in a conference server router to isolate the renegotiation to a single offer/answer exchange between a participant changing a media flow correlation and the web conference server. The result is significant interactive real-time performance, efficiency, and capability benefits to server-routed multipoint/broadcast conferences designed for global-scale applications.

For this patent, the phrase "RTP engine" means a computing device or software operating on a computing device that inputs RTP packets, manipulates the data within the RTP packets, and outputs the modified RTP data packets. This logic processing element may be or include one or more microprocessors, field programmable gate arrays (FPGAs), application specific integrated circuits (ASICs), programmable logic devices (PLDs) and programmable logic arrays (PLAs).

Recent Real Time Communication (RTC) technologies such as the Internet Engineering Task Force (IETF)/World Wide Web Consortium (W3C) "Open WebRTC" have introduced techniques for handling large numbers of media flows during communication sessions. A common approach for signaling the session information, and used by WebRTC, is to exchange the media information using Session Description Protocol (SDP). Within SDP, "m-line" attributes provide information describing a media flow such as a video or audio stream. The m-line attribute information typically includes the source IP address and port, payload to codec mappings, codec configurations, media extensions such as Forward Error Correction (FEC), and other information required to configure media stream flow. To add more streams, corresponding m-lines are added. To remove streams, corresponding m-lines are removed. When a participant's configuration changes during an "active session", such as adding or removing streams, the participant must notify this change through a renegotiation process with affected conference elements. The affected conference elements may be one or more participants or a web conference server. The classic approach is to renegotiate participant configuration changes with all conference participants. This approach is inefficient for large numbers of connections within a communication session where there are a reasonable number of multiple media flows.

WebRTC defines Extensions to the early RTP specification to address the inefficiencies. Including port bundling limits the number of ports per session. Also, including media source information such as the RTP SSRC used to identify the source of a media flow. The SDP definition used by WebRTC contains three elements for each media flow that must be "mutually correlated for proper functioning: m-lines, media stream tracks and RTP sources." The correlation of these three elements defines a Media Flow Correlation (MFC). The media stream tracks in an MFC are identified with the "msid" attribute, and the RTP sources by the SSRC attribute. The correlation is established during signaling of session establishment with the offer/answer negotiation. Under the "circumstance that an SSRC change is required for an existing media source, then any party that has changed its SSRC needs to inform the remote participants of the updated mapping, e.g. via a new SDP offer." In a web conference server, this requires that all participants be signaled with this new offer. In web conferences where the number of senders are limited and participants must renegotiate every time a media stream is added or removed. This can become inefficient, burdensome, and with large interactive broadcast style conferences, impractical.

The conference routed SSRC mapping technique extends the design of the web conference server to provide a means in which a participant can either add or remove media streams with a single offer/answer renegotiation with the web conference server rather than requiring offer/answer renegotiations with each participant in the web conference.

The web conference server allocates a pool of MFCs (MFC Pool) for a conference and to describe this entire set of MFCs in the answer for each offer/answer negotiation between the conference router and the conference participants (FIG. 5). The MFC Pool is stored in a digital memory that is accessible to the RTP Engine.

A web conference participant becomes a media flow sender by signaling this in an offer with setting the SEND-RCV attribute for the media flow in the SDP m-line. Upon receipt of the offer, the web conference server assigns a MFC from the allocated pool to the participant and returns the allocated pool of MFCs minus the media flow assigned (FIG. 6). The RTP Engine then maps the SSRC values in the RTP and RTCP packets for all media received from and sent to the participant that correlates to the assigned media flow in the packet routing process. SSRC mapping in the RTP Engine consists of two separate operations:

1. For RTP data packets input to the RTP Engine, the SSRC value of the sender in the RTP packet header is translated according to the mapped SSRC values obtained from the MFC Pool (FIG. 6) in digital memory.

2. For feedback messages such as NACK or PLI in RTCP data packets input to the RTP engine that are forwarded to the media source, the SSRC value of the media source in the RTCP feedback packet header is translated according to the mapped SSRC values obtained from the MFC Pool (FIG. 6) in digital memory. Duplicate feedback messages are dropped. Forwarding of feedback messages may be unnecessary if RTP packet caching in the RTP Engine is implemented.

In addition to the SSRC mapping operations, the RTP Engine also must process RTCP sender and receiver reports received from participants as well as generate RTCP sender and receiver reports that are sent to participants. This requirement is in accordance with WebRTC and related RTP specifications. To perform this requirement the RTP Engine maintains an SSRC context stored in digital memory for each SSRC.

A conference participant removes media streams by sending an offer with RCVONLY attribute for the media flow in the SDP m-line. Upon receipt of the offer, the web conference server removes the assignment to the sender's MFC, and the MFC is again available to be assigned from the MFC Pool (FIG. 6). The SDP in the answer returned from the web conference server will now contain m-line attributes for the unassigned MFC in addition to all the other MFCs in the MFC Pool (FIG. 6).

Referring now to FIG. 1, a block diagram of a system for web conferencing is shown. The system includes a web conference server 110, a mobile device 120, a computer 130, and a tablet device 140, all interconnected by a network 150.

Figure 2:
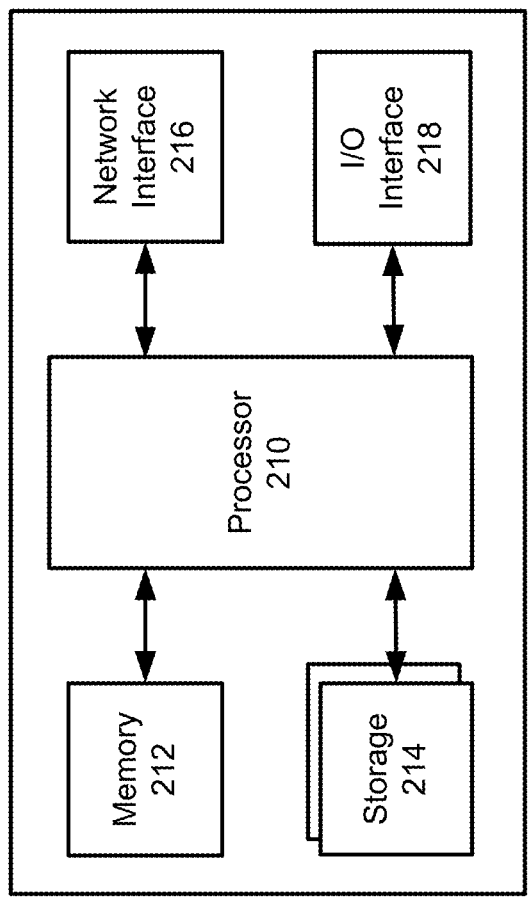
FIG. 2 is a block diagram of a computing device.

The web conference server 110 server is a computing device (FIG. 2). The server 110 is a server incorporating software intended to enable web conferences. The web conference server 110 maintains a server MFC pool for each web conference. The web conference server 110 is shown as a single computing device. However, in implementation, the web conference server 110 may be multiple or many computing devices. For example, the server may include a database server and a file server. As the number of web conferences hosted and routed by the web conference server 110 grows, the web conference server 110 may become a cluster of servers or may grow to include sets of web conference servers throughout the United States or world to better serve participants involved in web conferences.

The mobile device 120 may be a smartphone, tablet, or other computing device (FIG. 2). The mobile device 120 includes at least one form of media capture device or has access to one (e.g. through a USB (universal serial bus) connector or wirelessly). The media capture device may be a microphone, a camera (still or video), a keyboard or on-screen keyboard, and similar media capture or media creation devices. The media is transmitted in real-time by the mobile device 120 (or other computing device) to the web conference server 110 for routing to other participants in a web conference.

The computer 130 and tablet device 140 are substantially similar to mobile device 120 but are shown to demonstrate that the form factor of the participant computing device is not relevant to the subject matter of this application.

The network 150 is a computer network that provides interconnectivity between the web conference server 110, the mobile device 120, the computer 130, and the tablet device 140. The network 150 may be or include the internet. The network 150 may rely upon well-known protocols for the interconnection of computing devices such as TCP/IP, Ethernet, Bluetooth, and other protocols. The network 150 enables the various connected devices to communicate with one another and with the server 120 to route media during a web conference.

Turning now to FIG. 2 there is shown a block diagram of a computing device 200, which represents the web conference server 110, the mobile device 120, the computer 130, and the tablet device 140 in FIG. 1. The computing device 200 may be, for example, a desktop or laptop computer, a server computer, a tablet, a smartphone or other mobile device. The computing device 200 may include software and/or hardware for providing functionality and features described. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described.

The computing device 200 has a processor 210 coupled to a memory 212, storage 214, a network interface 216 and an I/O interface 218. The processor 210 may be or include one or more microprocessors, field programmable gate arrays (FPGAs), application specific integrated circuits (ASICs), programmable logic devices (PLDs) and programmable logic arrays (PLAs).

The memory 212 may be or include RAM, ROM, DRAM, SRAM and MRAM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210. As used herein the term "memory" corresponds to the memory 212 and explicitly excludes transitory media such as signals or waveforms.

The storage 214 provides non-volatile, bulk or long-term storage of data or instructions in the computing device 200. The storage 214 may be a magnetic or solid-state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the terms "storage" and "storage medium" correspond to the storage 214 and explicitly exclude transitory media such as signals or waveforms. Sometimes, such as those involving solid state memory devices, the memory 212 and storage 214 may be a single device.

The network interface 216 includes an interface to a network such as network 150 (FIG. 1). The network interface 216 may be wired or wireless.

The I/O interface 218 interfaces the processor 210 to peripherals (not shown) such as displays, video and still cameras, microphones, keyboards and USB devices.

Figure 3:
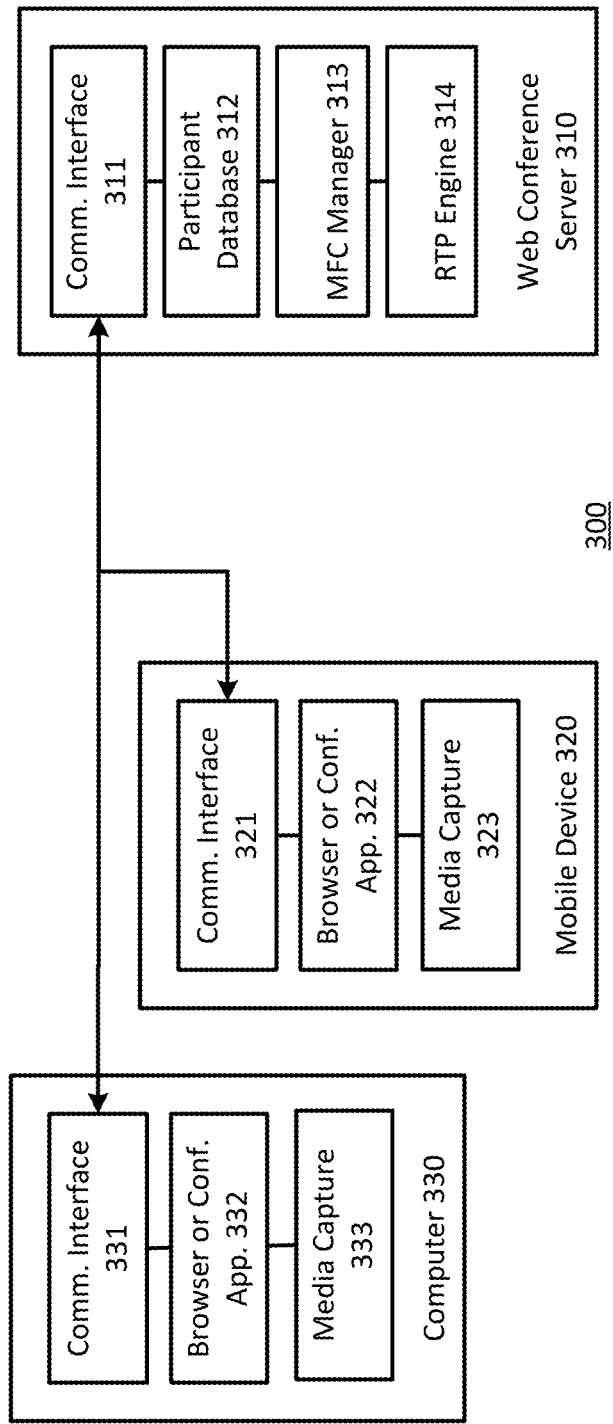
FIG. 3 is a functional diagram of a system for web conferencing.

FIG. 3 is a functional diagram of a system for web conferencing. The web conference server 310, the mobile device 320 and the computer 330 of FIG. 1 are shown. The table device 140 is not shown, because its description would be largely redundant of the web conference server 310 and mobile device 320. This FIG. 3 describes the computing devices in terms of the functions they perform.

The web conference server 310 includes a communications interface 311, a participant database 312, an MFC manager 313, and an RTP engine 314. The functions of these devices may be realized as hardware or software implementations.

The communications interface 311 enables communication between the devices. It may employ standard protocols such as TCP/IP and rely upon standard hardware standards such as Ethernet or 802.11x wireless connections. However, the web conference server 310 also relies upon protocols such as RTP, RTCP, SDP, and WebRTC to enable the functionalities described.

The participant database 312 maintains a listing of current web conferences, and the associated participants and listeners, along with the MFC pool of available media flow correlations that may be allocated to listeners as they request to begin participating in a given web conference.

The MFC manager 313 allocates and deallocates media flow correlations from the MFC pool. These media flow correlations, as discussed more fully below, are allocated as a non-participant indicates that it wishes to become a participant or listener in a web conference. The media flow correlations may be de-allocated, and returned to the MFC pool as a given participant or listener leaves a web conference, or indicates that it wishes to become a non-participant.

The RTP engine 314 receives RTP packets from participants and listeners who are receiving media flows, manipulates the data within the various RTP packets, and outputs the modified RTP data packets according to the MFC pool. Modification of the RTP packets consists of mapping the SSRC sender field in the packet header and the SSRC media source field in forwarded RTCP feedback packets. The RTP engine 314 processes input RTCP packets and generates output RTCP packets as required by WebRTC.

The mobile device 320 has a communications interface 321, a browser or conference application 322, and media capture 323 capabilities. The communications interface 321 functions in much the same way as the communications interface 311. However, the communications interface 321 also communicates directly, through media flows, to other participants in any ongoing web conference, for example, transmitting and receiving audio and video streams for each participant in the web conference, while transmitting its own audio and/or video stream to the other participants.

The browser or conference application 322 enables the mobile device 320 to participate in web conferences. One of WebRTC's primary capabilities is that it may operate completely within a web browser. Implementations involving dedicated applications are also envisioned. In either case, the purpose of the browser or conference application 322 is to enable display of and playback of the associated video and audio streams for each participant in a web conference, and to provide a user interface to enable interactions with the web conference such as text chat, altering the volume, disabling the camera or mic, and other, similar functions.

Finally, the mobile device 320 includes media capture 323 which is functionality designed to capture the device display, audio, and/or video streams for transmission to other participants and listeners in the web conference. The media capture 323 involves hardware, such as cameras and microphones, but also involves software operating on the mobile device 320 to capture and encode that information in a form suitable for transmission to other web conference participants.

The computer 330 includes a communication interface 331, a browser or conference application 332, and media capture 333. These each perform the same functions as those described above regarding the communications interface 321, the browser or conference application 322, and the media capture 323. Those descriptions will not be repeated here.

Description of Processes

Figure 4:
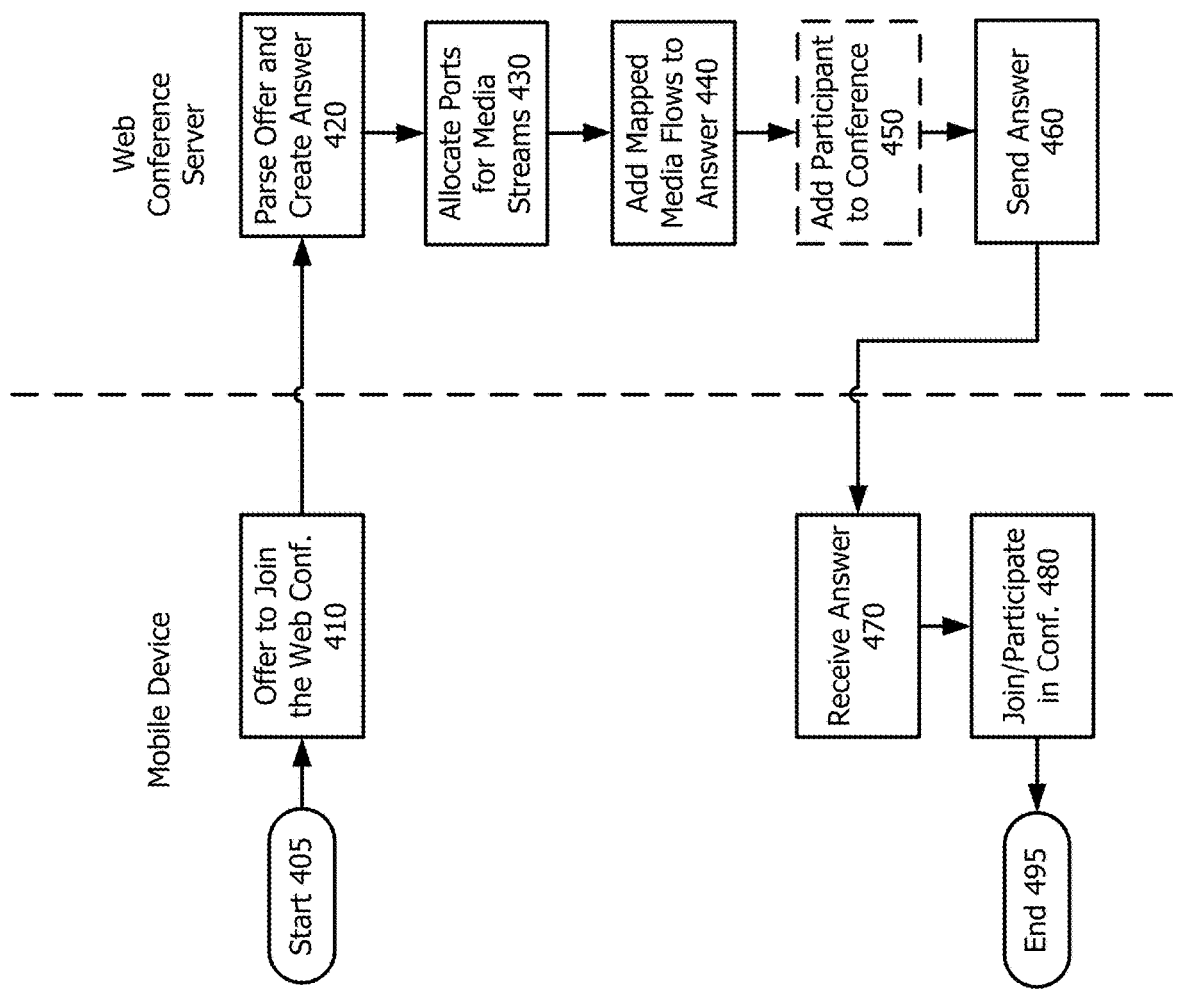
FIG. 4 is a flow chart of a process of initiating a web conference.

Referring now to FIG. 4, a flow chart of a process for initiating a web conference is shown. The flow chart has both a start 405 and an end 495, but the process is cyclical. The process may begin and end often as new participants or listeners are added to a web conference.

Following the start 405, a mobile device (or other computing device) requests to initiate a new web conference at 410. This request includes the offer from the mobile device. In a typical situation, a web conference server requests information regarding the number of participants and listeners in the web conference, or all participants and listeners request to join simultaneously. Then, each participant participates in the offer/acceptance process to set up the media flow correlations for actual or anticipated media flows between the participants. The process described herein is similar, but slightly different.

Referring now to FIG. 4, a flow chart of a process for adding a participant to a web conference is shown. The flow chart has a start 405 and an end 495, but a negotiation process may take place as often as participants are added to an ongoing web conference.

After the start 405, the process requests to join a web conference with an offer to join at 410. This request either requests a new web conference or identifies a particular web conference that a computing device wishes to join. The offer may indicate, for example, that the non-participant will start the conference in receive only configuration and that no audio or video streams will be transmitted by that non-participant when initially joining the conference.

This offer is received by the web conference server, which is then tasked with parsing the offer and creating an answer at 420. These operations are in accordance with the WebRTC and RTP specifications.

Based on the requirements of the offer and answer, the web conference server allocates network ports as required by the WebRTC and RTP specifications at 430.

In the initial offer to join a web conference the computing device is configured as a listener. For an ongoing web conference, since no media is being sent by the listener, there is no need to re-negotiate this configuration with participants already joined in the web conference. Participants that are joined in the ongoing web conference and that are sending media streams already have those streams represented in the MFC pool. The media will continue to be sent and will begin being sent to the new participant once joined to the web conference. The SSRCs and associated media descriptions for the server media flow correlations from the MFC Pool are added to the SDP in the answer at 440 that is sent to the listener. If this is the first participant in the conference, the server MFC pool is created an initialized with the mapped SSRC values and associated media descriptions. For later participants joining the conference, the server media flow correlations include those with assigned sender media flow correlations for the participants as well as those in the MFC pool that are not yet assigned.

If the listener's offer optionally indicates that the listener wishes to be a participant, then an unused media flow correlation from the MFC pool may be assigned to this listener at 450, soon-to-be-participant. If this is an ongoing web conference, and there are already media flow correlations that are unassigned to any participant available, the parsing of the offer and creation of an answer may only take place between the new non-participant and the web conference server, as opposed to between the new participant and each, other participant.

The participant in the web conference, is added to the conference participant database at 450. The answer confirming that the participant has joined the conference is sent by the web conference server at 460, received by the mobile device at 470, and may thereafter receive media streams (as a listener) or participate (as a participant) in the web conference at 480.

The process then ends at 495.

FIG. 5 is a functional diagram of a status of the MFC pool. It includes server MFCs and sender MFCs. The server allocates 1 to n media flow correlations in the MFC pool. None of the media flow correlations will be used by any participant, as the web conference is initiated. FIG. 5 is also the state of the MFC pool after completing step 440 in FIG. 4, before the first participant has joined. Here, slot 510 shows the server MFC, but no corresponding sender MFC has been assigned at 512.

Turning to FIG. 6, a functional diagram of a status of media flow allocations after two participants have been allocated is shown. Specifically, the slots 710 and 714 are now assigned to sender_01 at 612 and sender_02 at 716, respectively. This means those slots of audio and video data streams are now designated for use by sender_01 and sender_02. The rest remain unassigned but may be allocated as participant configurations change to add audio or video streams to one of the allocated media flow correlations in the MFC pool. They may change further still, as changes are renegotiated with the web conference server, described more fully below with reference to FIG. 8.

Figure 7:
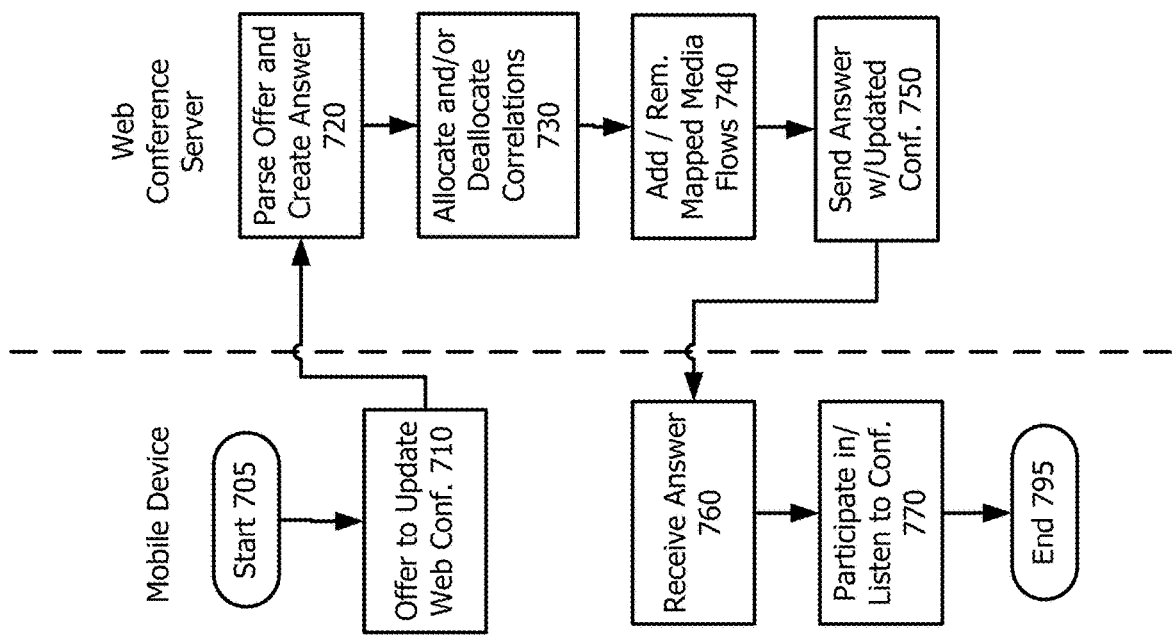
FIG. 7 is a flow chart of a process for updating a participant configuration in a web conference.

FIG. 7 is a flow chart of a process for updating a participant configuration in a web conference. The flow chart has a start 705 and an end 795, but may take place often as participants and listeners request to add and/or remove media streams and renegotiate these changes to a web conference server during an ongoing web conference.

After the start 705, the process begins with an offer from a participant mobile device to renegotiate an ongoing web conference at 710. This request identifies a particular web conference that a user is currently joined and wishes to renegotiate it's configuration. This renegotiation may be a request to transition from a participant to a listener (e.g. to stop transmitting an audio or video stream) or to transition from a listener to a participant (e.g. to begin transmitting an audio or video stream). This request is received by the web conference server.

In typical a WebRTC or RTP conference, this process involves the interaction of every participant in the web conference through the renegotiation process of an offer and an answer. However, because the web conference server maps the media streams being added or removed by the participant renegotiating the connection using the media flow correlations mapped by the server MFC pool, every participant is already expecting, and has already negotiated through offer/answer, the proper representation of the server MFC pool need not be renegotiated by each participant or listener, but merely with the web conference server itself.

A renegotiation offer is received by the web conference server, which is then tasked with parsing the offer, creating an answer at 820. These operations are in accordance with the WebRTC and RTP specifications.

Based on the media descriptions parsed from the offer, the web conference server allocates media flow correlations for added media streams or deallocates media flow correlations for removed media streams from the web conference server MFC pool at 730.

Except for media flow correlations allocated from the server MFC pool for this participant, the SSRCs and associated media descriptions from all other correlations in the server MFC pool are added to the SDP in the answer at 740.

The answer is then sent to the participant indicating that the participant has updated its configuration at 750.

The participant (or listener) then receives the answer including the updated configuration at 760.

Unlike traditional WebRTC configuration renegotiations, further renegotiation with the other conference participants and listeners is not required. The other conference participants will either begin to receive the added media streams with the previously unused mapped SSRC or will stop receiving the removed media streams with the previously in-use mapped SSRC. The updated digital memory store of the web conference server MFC pool is referenced for each RTP and RTCP data packet input to the RTP Engine so that subsequent SSRC mapping operations, feedback packet forwarding, and RTCP report generation remains synchronized with participant configuration changes.

The process then ends at 795.

FIG. 8 is a functional diagram of a status of media flow allocations after three participants have been allocated. This figure has the same media flow allocations in FIGS. 5 and 5. However, this figure depicts an example following step 730 in FIG. 7 once the previously-unused media flow allocation has been allocated to sender_03. Sender_03 receive the answer from the web conference server with the SSRC and associated media descriptions associated with the allocated correlation as shown in 750, and participates in the conference at 760 using the newly-designated MFC aside for sender_03's use.

Figure 9:
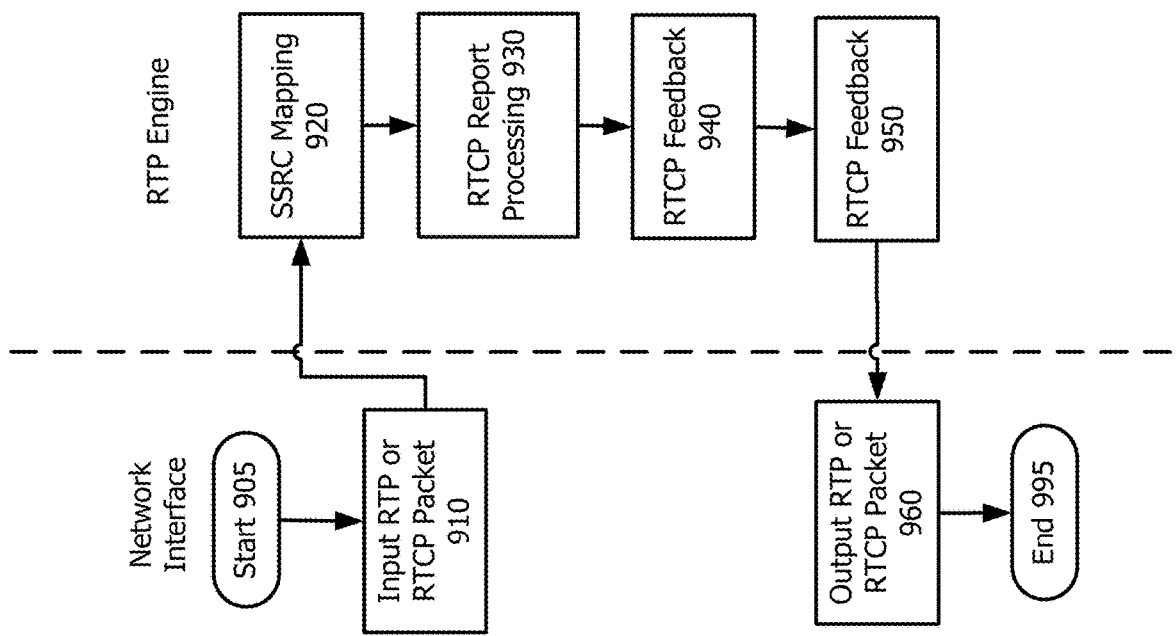
FIG. 9 is a functional diagram of SSRC mapping being applied to a conferenced media stream.

FIG. 9 is a flow chart for the flow of RTP and RTCP data packets from the input from the network interface to the RTP engine and output from the RTP engine to the network interface. The flow chart has a start 905 and an end 995, but may take place often as RTP and RTCP packets associated with an ongoing web conference are received on the network interface.

After the start 905, the process begins with an RTP or RTCP packet from a web conference participant received on the network interface at 1910. Packets are identified as being sourced by a conference participant based on the receive port address and the source SSRC in the RTP or RTCP packet header. This information is then used to identify the particular web conference. A packet is input to the RTP engine along with references to the digital store of the particular web conference participant database and the particular server MFC pool. A typical RTP routing engine would only require a reference to the digital store of the conference participant list for forwarding the packet. The RTP engine detailed in this invention also requires the server MFC pool associated with the particular web conference for the SSRC mapping operation.

The SSRC mapping operation is applied to RTP packets and forwarded RTCP feedback packets input to the RTP engine at 920. The mapping applied to the SSRC source field in the header of RTP packets. The mapping is also applied to the SSRC media source field in RTCP feedback packets.

All RTCP sender and receiver reports input to the RTP Engine are processed in accordance with the WebRTC and RTP specifications at 930.

Duplicate and ignored RTCP feedback packets input to the RTP Engine are dropped at 940. RTCP sender and receiver reports are generated in accordance with the WebRTC and RTP specifications at 950. RTP packets and RTCP feedback packets with SSRC mappings applied as well as RTCP packets generated by the RTP engine are output to the network interface at 960.

The process then ends at 995.

Closing Comments

Throughout this description, the embodiments and examples shown should be considered as exemplars, rather than limitations on the apparatus and procedures disclosed or claimed. Although many examples presented herein involve specific combinations of method acts or system elements, it should be understood those acts and those elements may be combined in other ways to accomplish the same objectives. Regarding flowcharts, additional and fewer steps may be taken, and the steps as shown may be combined or further refined to achieve the methods described. Acts, elements and features discussed only in connection with one embodiment are not intended to be excluded from a similar role in other embodiments.

"Plurality" means two or more, and a "set" of items may include one or more of such items. Whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases regarding claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for the ordinal term) to distinguish the claim elements. As used herein, "and/or" means that the listed items are alternatives, but the alternatives also include any combination of the listed items.

It is claimed:

1. A web conference server comprising a processor and memory, memory storing instructions which when executed by the processor cause the processor to:
   generate a media flow correlation pool including a plurality of paired server and sender media flow correlations each comprising a synchronization source identifier, a media stream identifier, and a media type identifier for each of a plurality of potential participants, the server media flow correlations each being unique in the web conference and assigned to the web conference server, the sender media flow correlations being unassigned until a non-participant joins the web conference, the media flow correlation pool including a first sender media flow correlation for a first non-participant and additional sender media flow correlations for at least one additional non-participant;
   begin the web conference;
   provide the entire media flow correlation pool, including additional sender media flow correlations that are not yet assigned, to each participant in the web conference;
   receive a request to join a web conference from the first non-participant;
   assign the first sender media flow correlation from the media flow correlation pool to the first non-participant;
   respond to the first non-participant accepting the first non-participant as a first participant in the web conference by indicating to the first participant in a manner conforming to the WebRTC specification, including an indication of an assigned synchronization source identifier, media stream identifier, and media type identifier from the first sender media flow correlation, that the first participant has joined the web conference in response to the request; and
   continue the web conference with the first sender media flow correlation assigned to the first participant and the additional sender media flow correlations available in the media flow correlation pool for use by subsequent non-participants in the web conference who may request to be added to the web conference as a participant such that communications sent to a particular server media flow correlation are translated and sent by the web server as communications to a corresponding sender media flow correlation.

2. The web conference server of claim 1 wherein the instructions further cause the processor to:
   receive a request by a second non-participant to join the web conference as a participant;
   assign one of the additional sender media flow correlations, corresponding to an additional paired server media flow correlation, from the media flow correlation pool to the second non-participant as a second sender media flow correlation to use within the web conference;
   respond to the request from the second non-participant accepting the second non-participant as a second participant in the web conference in a manner conforming to the WebRTC specification including identification of the synchronization source identifier, the media stream identifier, and the media type identifier at the web conference server for use by the second participant to communicate in the web conference, wherein communications using the assigned sender media flow correlation will be translated upon receipt by the web conference server into output on the additional paired server media flow correlation; and
   provide the entire media flow correlation pool, including additional sender media flow correlations that are not yet assigned, to the second non-participant in the web conference;
   continue the web conference, now including the second participant while directing media flows according to the first and second sender media flow correlations in the media flow correlation pool.

3. The web conference server of claim 2 wherein the instructions further cause the processor to:
   receive an RTP data packet from the first participant using the first sender media flow correlation;
   modify the SSRC sender field and media source field in a RTCP feedback packet header of the RTP data packet to the web conference server;
   send the RTP data packet from the first participant to all other participants, listeners, and viewers in the web conference using a paired first server media flow correlation; and
   generate and respond to the first participant with a responsive output RTCP data packet.

4. The web conference server of claim 1 wherein the instructions further cause the processor to:
   receive a termination request to update the web conference from the first participant indicating that the first participant wishes to terminate participation in the web conference;
   unassign the first sender media flow correlation used by the first participant and return the first sender media flow correlation to the media flow correlation pool for use by a subsequent non-participant wishing to participate in the web conference; and
   respond to the termination request from the first participant by indicating to the first participant that the web conference no longer includes the first participant.

5. The web conference server of claim 1 wherein the instructions further cause the processor to translate the SSRC values in all incoming RTP data packets from the first participant to all other participants and listeners in the web conference using the media flow correlation pool.

6. The web conference server of claim 5 wherein the instructions further cause the processor to translate received RTP data from one participant to another participant according to mapped SSRC values in the media flow correlation pool.

7. A method for routing a web conference comprising:
generating a media flow correlation pool including a plurality of paired server and sender media flow correlations each comprising a synchronization source identifier, a media stream identifier, and a media type identifier for each of a plurality of potential participants, the server media flow correlations each being unique in the web conference and assigned to the web conference server, the sender media flow correlations being unassigned until a non-participant joins the web conference, the media flow correlation pool including a first sender media flow correlation for a first non-participant and additional sender media flow correlations for at least one additional non-participant;
beginning the web conference;
providing the entire media flow correlation pool, including additional sender media flow correlations that are not yet assigned, to each participant in the web conference;
receiving a request to join a web conference from the first non-participant;
assigning the first sender media flow correlation from the media flow correlation pool to the first non-participant;
responding to the first non-participant accepting the first non-participant as a first participant in the web conference by indicating to the first participant in a manner conforming to the WebRTC specification, including an indication of an assigned synchronization source identifier, media stream identifier, and media type identifier from the first sender media flow correlation, that the first participant has joined the web conference in response to the request; and
continuing the web conference with the first sender media flow correlation assigned to the first participant and the additional sender media flow correlations available in the media flow correlation pool for use by subsequent non-participants in the web conference who may request to be added to the conference as a participant such that communications sent to a particular server media flow correlation are translated and sent by a web server as communications to a corresponding sender media flow correlation.

8. The method of claim 7 further comprising:
receiving a request by a second non-participant to join the web conference as a participant;
assigning one of the additional sender media flow correlations, corresponding to an additional paired server media flow correlation, from the media flow correlation pool to the second non-participant as a second sender media flow correlation to use within the web conference;
responding to the request from the second non-participant accepting the second non-participant as a second participant in the web conference in a manner conforming to the WebRTC specification including identification of the synchronization source identifier, the media stream identifier, and the media type identifier at the web conference server for use by the second participant to communicate in the web conference, wherein communications using the assigned sender media flow correlation will be translated upon receipt by the web conference server into output on the additional paired server media flow correlation; and
providing the entire media flow correlation pool, including additional sender media flow correlations that are not yet assigned, to the second non-participant in the web conference;
continuing the web conference, now including the second participant while directing media flows according to the first and second sender media flow correlations in the media flow correlation pool.

9. The method of claim 8 further comprising:
receiving an RTP data packet from the first participant using the first sender media flow correlation;
modifying the SSRC sender field and media source field in a RTCP feedback packet header of the RTP data packet to the web conference server;
sending the RTP data packet from the first participant to all other participants, listeners, and viewers in the web conference using a paired first server media flow correlation; and
generating and responding to the first participant with a responsive output RTP data packet.

10. The method of claim 7 further comprising:
receiving a termination request to update the web conference from the first participant indicating that the first participant wishes to terminate participation in the web conference;
unassigning the first sender media flow correlation used by the first participant and return the first sender media flow correlation to the media flow correlation pool for use by a subsequent non-participant wishing to participate in the web conference; and
responding to the termination request from the first participant indicating to the first participant that the web conference no longer includes the first participant.

11. The method of claim 7 further comprising translating the SSRC values in all incoming RTP data packets from the first participant to all other participants and listeners in the web conference using the media flow correlation pool.

12. The method of claim 11 further comprising translating received RTP data from one participant to another participant according to mapped SSRC values in the media flow correlation pool.

13. Apparatus comprising a non-volatile, machine-readable medium storing a program having instructions which when executed by a processor will cause the processor to serve as a web conference server, the instructions of the program for:
generating a media flow correlation pool including a plurality of paired server and sender media flow correlations each comprising a synchronization source identifier, a media stream identifier, and a media type identifier for each of a plurality of potential participants, the server media flow correlations each being unique in the web conference and assigned to the web conference server, the sender media flow correlations being unassigned until a non-participant joins the web conference, the media flow correlation pool including a first sender media flow correlation for a first non-participant and additional sender media flow correlations for at least one additional non-participant;

beginning the web conference;
providing the entire media flow correlation pool, including additional sender media flow correlations that are not yet assigned, to each participant in the web conference;
receiving a request to join a web conference from the first non-participant;
assigning the first sender media flow correlation from the media flow correlation pool to the first non-participant;
responding to the first non-participant accepting the first non-participant as a first participant in the web conference by indicating to the first participant in a manner conforming to the WebRTC specification, including an indication of an assigned synchronization source identifier, media stream identifier, and media type identifier from the first sender media flow correlation, that the first participant has joined the web conference in response to the request; and
continuing the web conference with the first sender media flow correlation assigned to the first participant and the additional sender media flow correlations available in the media flow correlation pool for use by subsequent non-participants in the web conference who may request to be added to the conference as a participant such that communications sent to a particular server media flow correlation are translated and sent by a web server as communications to a corresponding sender media flow correlation.

14. The apparatus of claim 13 wherein the instructions of the program are further for:
receiving a request by a second non-participant to join the web conference as a participant;
assigning one of the additional sender media flow correlations, corresponding to an additional paired server media flow correlation, from the media flow correlation pool to the second non-participant as a second sender media flow correlation to use within the web conference;
responding to the request from the second non-participant accepting the second non-participant as a second participant in the web conference in a manner conforming to the WebRTC specification including identification of the synchronization source identifier, the media stream identifier, and the media type identifier at the web conference server for use by the second participant to communicate in the web conference, wherein communications using the assigned sender media flow correlation will be translated upon receipt by the web conference server into output on the additional paired server media flow correlation; and
providing the entire media flow correlation pool, including additional sender media flow correlations that are not yet assigned, to the second non-participant in the web conference;
continuing the web conference, now including the second participant while directing media flows according to the first and second sender media flow correlations in the media flow correlation pool.

15. The apparatus of claim 14 wherein the instructions of the program are further for:
receiving an RTP data packet from the first participant using the first sender media flow correlation;
modifying the SSRC sender field and media source field in a RTCP feedback packet header of the RTP data packet to the web conference server;
sending the RTP data packet from the first participant to all other participants, listeners, and viewers in the web conference using a paired first server media flow correlation; and
generating and responding to the first participant with a responsive output RTP data packet.

16. The apparatus of claim 14 wherein the instructions of the program are further for:
receiving a termination request to update the web conference from the first participant indicating that the first participant wishes to terminate participation in the web conference;
unassigning the first sender media flow correlation used by the first participant and return the first sender media flow correlation to the media flow correlation pool for use by a subsequent non-participant wishing to participate in the web conference; and
responding to the termination request from the first participant by indicating to the first participant that the web conference no longer includes the first participant.

17. The apparatus of claim 13 wherein the instructions of the program are further for translating the SSRC values in all incoming RTP data packets from the first participant to all other participants and listeners in the web conference using the media flow correlation pool.

18. The apparatus of claim 17 wherein the instructions of the program are further for translating received RTP data from one participant to another participant according to mapped SSRC values in the media flow correlation pool.

19. The apparatus of claim 13 further comprising:
a processor;
a memory; and
wherein the processor and the memory comprise circuits and software for performing the instructions on the storage medium.

* * * * *